United States Patent [19]

Helm

[11] 4,181,329
[45] Jan. 1, 1980

[54] RELEASABLE TUBE COUPLING

[75] Inventor: Homer E. Helm, Troy, Mich.

[73] Assignee: Gordon H. Cork, Birmingham, Mich.

[21] Appl. No.: 8,558

[22] Filed: Feb. 2, 1979

[51] Int. Cl.² .............................................. F16L 37/12
[52] U.S. Cl. ...................................... 285/3; 285/39; 285/305; 285/321; 285/340; 285/423
[58] Field of Search ............... 285/340, 321, 423, 305, 285/403, 3, 4, 39

[56] References Cited

U.S. PATENT DOCUMENTS

| 1,019,000 | 2/1912 | Watson | 285/305 |
| 3,874,709 | 4/1975 | MacDonald | 285/423 X |
| 4,073,514 | 2/1978 | Pate | 285/340 X |
| 4,146,254 | 3/1979 | Turner | 285/340 X |

FOREIGN PATENT DOCUMENTS

| 683853 | 4/1964 | Canada | 285/340 |
| 732901 | 6/1932 | France | 285/340 |
| 1486671 | 9/1977 | United Kingdom | 285/340 |
| 1520150 | 8/1978 | United Kingdom | 285/340 |

Primary Examiner—Dave W. Arola
Attorney, Agent, or Firm—Barnes, Kisselle, Raisch & Choate

[57] ABSTRACT

A releasable coupling for plastic or metal tubes wherein the means for retaining one end of a tube within the coupling body comprises a metal retainer ring having circumferentially spaced spring fingers thereon which incline radially and axially inwardly from the outer periphery of the ring. The inner ends of the fingers are adapted to frictionally engage and bite into the surface of a tube inserted therethrough to prevent its withdrawal. Axial movement of the ring within the coupling body is prevented in one direction by axially extending fingers on the ring engaging an inwardly projecting annular shoulder in the bore of the body. Axial movement of the ring in the opposite direction is prevented by retaining means located at least partially within the bore of the body positioned adjacent an annular seal engaging one face of the ring.

20 Claims, 8 Drawing Figures

RELEASABLE TUBE COUPLING

This invention relates to a releasable fluid-tight coupling for metal or semi-rigid plastic tubes.

In many industrial applications and consumer products tubing is employed for conducting fluids under pressure or vacuum to and from fluid-operated devices. The tubing is connected to the fluid pressure or vacuum source and to the operated device by means of couplings. From the standpoint of operation, it is important that the couplings are fluid-tight; from the standpoint of servicing, it is important that the tubing is adapted to be easily and readily connected to and disconnected from the coupling.

Tubing used in such industrial applications sometimes varies in size as much as 0.020 to 0.030" from a nominal size specified. In addition, such tubing is usually supplied in coiled rolls. When such tubing, especially semi-rigid plastic tubing, is coiled, its cross section tends to distort from a circular to a somewhat elliptical shape. Releasable tube couplings of conventional design are, for the most part, incapable of accommodating substantial tolerances in diameter of the tubing or tubes of a somewhat elliptical cross section.

The primary object of this invention is to provide fluid-tight releasable tube couplings designed to accommodate relatively large tolerances in tube diameter and which, at the same time, provide fluid-tight connections for tubes which have assumed a somewhat elliptical shape.

Other objects, features and advantages of the present invention will become apparent from the following description and accompanying drawings, in which.

Figure 1:
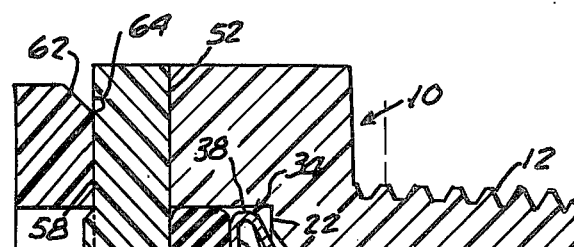
FIG. 1 is a longitudinal sectional view of a coupling according to the present invention showing the end of a plastic tube retained therein.
Figure 3:
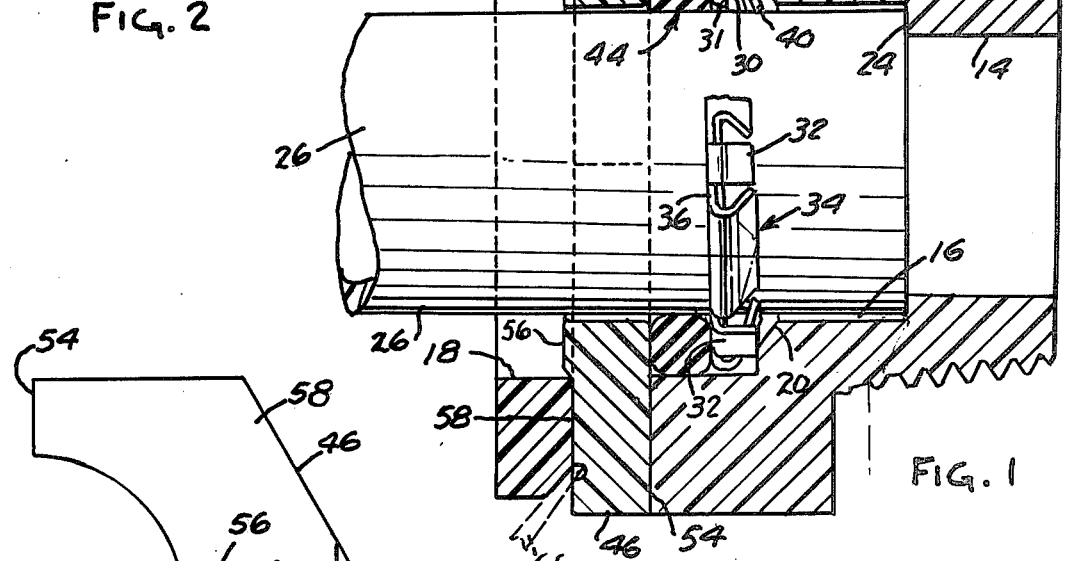
FIG. 3 is a plan view of one of the yokes illustrated in FIG. 1.

Referring first to FIGS. 1 through 5, the coupling of this invention comprises a body 10 which can be machined from metal, but which in the form shown in FIG. 1 is preferably molded from plastic. Although its external contour may vary, body 10 is shown hexagonally shaped with a threaded portion 12 at one end for connection with a fluid-operated device. Body 10 has a bore extending axially therethrough, the bore comprising three radially stepped portions 14, 16, 18. Bore portions 16, 18 are connected by a tapered bore portion 20 and a radially inwardly extending annular shoulder 22. Bore portions 14, 16 are connected by a radially inwardly extending shoulder 24. Bore portion 16 is dimensioned slightly larger than the outer diameter of the tube 26 for which the coupling is designed. The end of the tube when fully inserted into the coupling is adapted to abut against shoulder 24.

Figure 2:
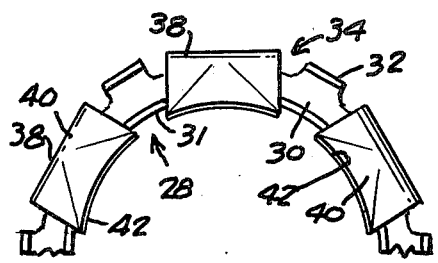
FIG. 2 is a fragmentary end elevational view of the retainer ring shown in FIG. 1.
Figure 8:
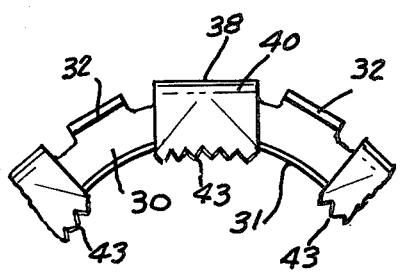
FIG. 8 is a fragmentary end view of a modified form of retainer ring.
Figure 5:
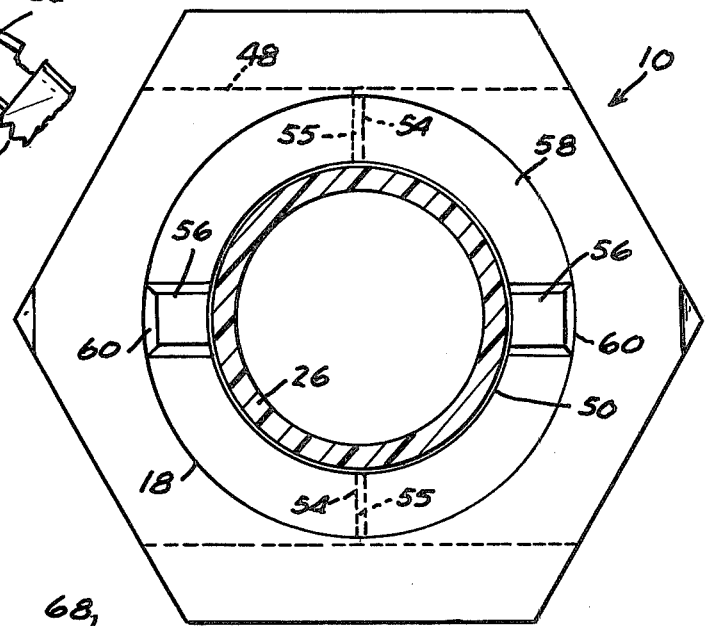
FIG. 5 is an end view of the coupling shown in FIG. 1, the tube therein being shown in section.

Within bore portion 18 there is arranged a spring metal retainer ring 28. Ring 28 includes a generally flat annular portion 30, the inner periphery of which is bent axially into a rim 31, the inner diameter of which is at least slightly larger than the outer diameter of tube 26. A plurality of circumferentially spaced, short, axially extending abutment fingers 32 project in one direction from the outer periphery of the annular portion 30 of the ring. In the operative position of the ring the free ends of fingers 32 are adapted to abut against shoulder 22 to limit displacement of the ring in a direction axially inwardly from the coupling; that is, to the right as viewed in FIG. 1. Between each pair of fingers 32 there is provided a spring finger 34. Each spring finger 34 extends radially outwardly as at 36 from the outer periphery of the flat annular portion 30 and then is bent inwardly about a radius as at 38 so that the portion 40 of each spring finger is inclined radially and axially inwardly as shown in FIG. 1. The portions 40 incline to the axis of the coupling bore at an angle between about 45° to 60°, preferably about 55°. The tapered bore portion 20 accommodates the inclined free end portions 40 of fingers 34. As shown in FIG. 2, the bends 38 are straight in a direction circumferentially of the ring rather than curved so as to not restrict the flexibility of the portions 40 of the fingers. However, if desired the portions 40 may be curved to a progressively increasing degree in a circumferential direction to the free ends 42 thereof. This progressively increasing curvature is illustrated by the uppermost finger 34 shown in FIG. 1. The free edges 42 of portions 40 are sharp and of arcuate shape so that these edges are capable of frictionally engaging and biting into the outer peripheral surface of tube 26 around an arcuate segment thereof. The curved cross section imparts rigidity to the portions 40 and at the same time provides a maximum tube gripping action at their free ends. If the tube used with the coupling is metal rather than plastic, the arcuate inner edges of the fingers are preferably serrated as indicated at 43 in FIG. 8 to enhance the gripping action thereof.

Figure 4:
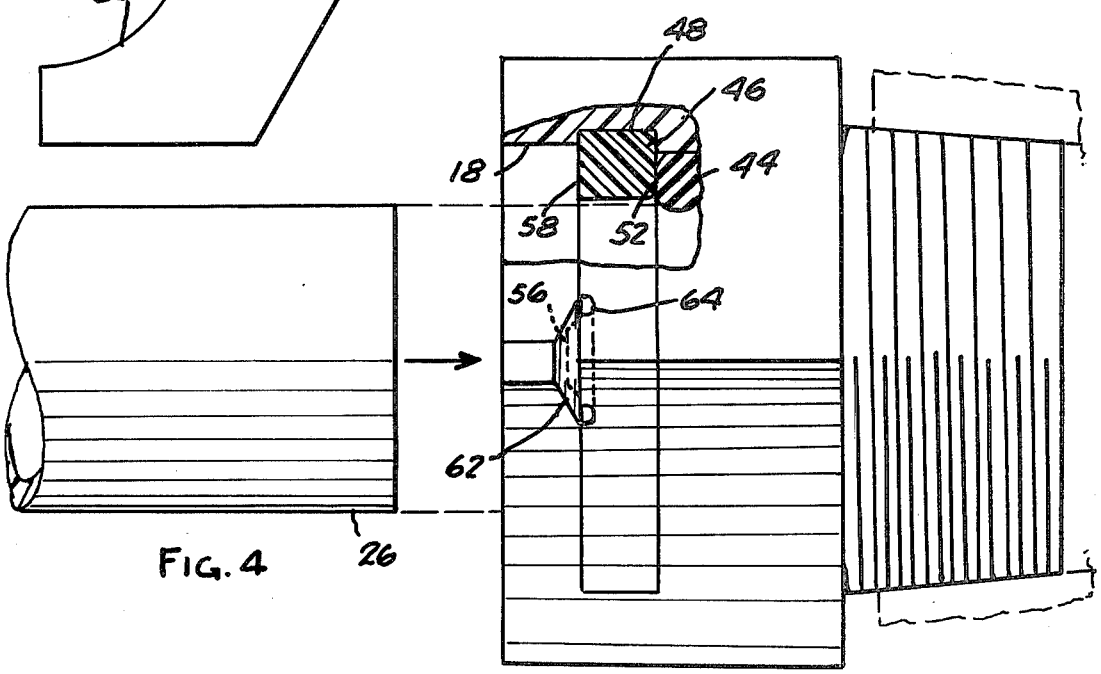
FIG. 4 is a top plan view, partly in section, of the coupling illustrated in FIG. 1.

An annular seal 44, preferably in the form of an elastomer O-ring, is fitted in bore portion 18 with one face thereof abutting the generally flat annular surface 30 of retainer ring 28. Seal 44 is dimensioned to seal with bore portion 18 around its outer periphery and with the outer surface of tube 26 around its inner periphery. Ring 28 and seal 44 are retained in position by a pair of diametrically opposed yokes 46. Each yoke has the configuration shown in FIG. 3. To accommodate yokes 46 body 10 is formed with an elongated slot 48 extending crosswise therethrough. As shown in FIG. 4 the length of slot 48 in a direction diametrically of the bore is greater than the diameter of bore portion 18. The width of slot 48 corresponds closely to the thickness of yokes 46. Each yoke 46 has formed at the inner end thereof a semi-circular surface 50, the diameter of which is slightly greater than that of the outer diameter of tube 26. Thus, when the two yokes 46 are inserted from opposite directions into slot 48, the surfaces 50 encircle tube 26 and the faces 52 of the yokes engage the axially outer side of seal 44. In the assembled position of yokes 46 the inner end faces 54 are in substantially abutting relation so that the two yokes provide a circumferentially continuous back-up surface for seal 44.

If desired, the two yokes 46 may be molded integrally as one piece and inserted through slot 48 before the tube 26 is inserted in the fitting. If the yokes are molded in one piece, they are preferably interconnected at their inner opposed ends 54 by a thin web 55 (FIG. 5) adapted to be readily fractured to enable their withdrawal, if desired, after the tube is assembled with the coupling.

Each yoke is provided with a slight protrusion 56 on the face 58 thereof. The protrusions 56 have a thickness only sufficient to form an interference fit with slot 48. When yokes 46 are fully seated in slot 48, the radially outer tapered edge 60 of each protrusion 56 engages the periphery of bore portion 18 to prevent the yokes from being displaced freely radially outwardly. In order to disengage and withdraw the yokes 46 from body 10, whether they are formed separately or as one piece, diametrically opposite portions of bore 10 are formed with angled recesses 62 which intersect slot 48. Likewise, each yoke 46 is provided with an undercut notch 64 which, in the assembled position of the yokes, registers with the recess 62. When it is desired to remove the tube from the fitting, it is necessary to retract the yokes from within slot 48. A prying tool 66, such as a screwdriver, can be inserted in recesses 62, engaged with notches 64 and then rocked to displace the yokes radially outwardly from body 10. This action will fracture web 55 if the yokes are formed as one piece. The tube, together with retaining ring 28 and seal 44, can then be withdrawn from the coupling body.

One of the important features of the present invention resides in the configuration of the fingers 34. These fingers are designed to be readily flexible. The high degree of flexibility is obtained by making the total length of the fingers substantially greater than the radial dimension of ring 28 between its inner and outer peripheries. These relatively long fingers are obtained by first extending them radially outwardly from the outer periphery of the generally flat annular portion 30 of the ring as at 36 and then extending them radially and axially inwardly so that the relatively rigid portions 40 terminate in free edges that are normally located substantially radially inwardly of the inner periphery of annular portion 30 and lie on a circle having a diameter substantially smaller than the outer diameter of the tube on which the coupling is used. The high degree of flexibility imparted to the fingers also results from the fact that the bends 38 are straight in a direction circumferentially of the ring rather than arcuate. Although the portions 40 of the fingers are, in and of themselves, relatively rigid and not apt to buckle, they are adapted to flex freely about the bends 38 and the short radially outwardly extending finger portions 36. Although the fingers 34 are relatively long, the ring itself does not have an excessively large diameter such as would be the case if the fingers extended from the inner, rather than the outer, periphery of the ring.

The described configuration of fingers 34 enables them to flex radially outwardly readily. They can be initially formed such that their free edges 42 define a circle substantially smaller than the tube intended to be used therewith. Thus, they can accommodate tubes 26 which vary appreciably in outer diameter. At the same time, each finger 34 is capable of freely flexing independently of the remaining fingers. Thus, if tube 26 is of somewhat elliptical shape, the individual fingers 34 are adapted to flex different amounts so that each of the fingers will still firmly and frictionally engage the outer surface of the elliptically shaped tube. It will also be noted that, since retainer ring 28 is located axially inwardly of seal 44, any scratches or grooves produced on the outer surface of the tube by the sharp edges 42 or 43 when the tube is inserted into the coupling bore will not affect the sealing action of O-ring 44.

Figure 6:
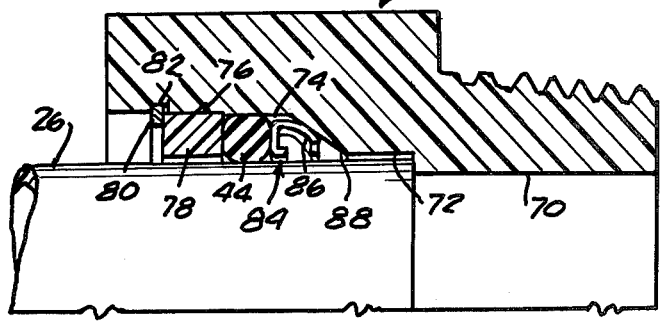
FIG. 6 is a fragmentary longitudinal sectional view of a modified form of coupling according to this invention.
Figure 7:
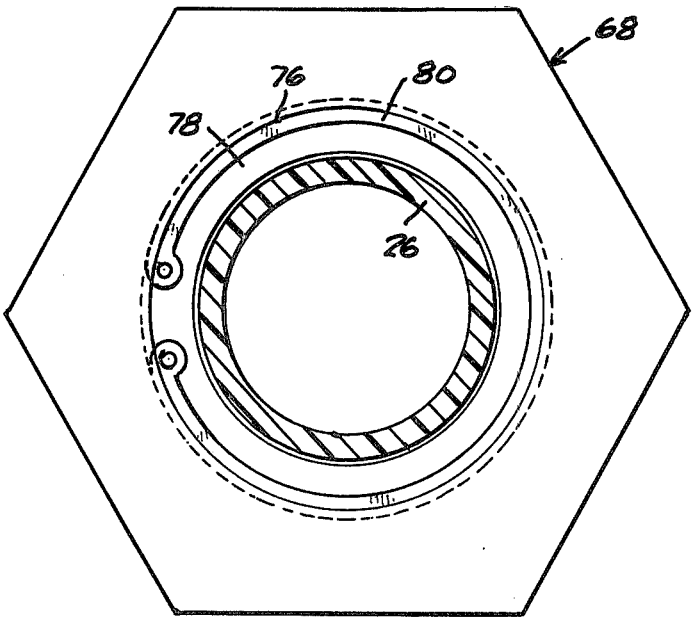
FIG. 7 is an end view of the coupling shown in FIG. 6.

The embodiment illustrated in FIGS. 6 and 7 illustrates several modifications of the arrangement shown in FIGS. 1 through 5. As distinguished from that shown in FIG. 1 wherein the body 10 is preferably formed of plastic so that the slot 48 can be molded therein, in the arrangement shown in FIGS. 6 and 7 the body 68 may preferably be formed of metal. As a practical matter body 68 could be a metal housing or manifold as distinguished from a threaded fitting, in which case the bore portions 70, 72, 74, 76 are merely machined as a series of successively stepped bores in the metal housing or manifold. In the arrangement shown in FIGS. 6 and 7 the means for retaining seal 44 properly positioned comprises a plastic washer 78 abutting against one side of seal 44 and retained in place by means of conventional snap ring 80 engaging an annular groove 82 in bore portion 76. The assembly of tube 26 with washer 78, seal 44 and retainer ring 84 thereon can be withdrawn from within groove 82 in the conventional manner.

Retainer ring 84 differs from ring 28 only with respect to the shape of abutment fingers 86. As distinguished from fingers 32 on ring 28 which are generally parallel to the central axis of the coupling, fingers 86 on ring 84 are inclined slightly in a radially inward direction. The inclination of fingers 86 is such that, when washer 78 and seal 44 are located in place by snap ring 80, ring 84 is displaced slightly axially inwardly of the coupling to a position where fingers 86 engage and are flexed inwardly by the tapered bore 88. Ring 84 thus applies an axially outward compressive force on seal 44. Seal 44 is, thus, preloaded and effectively seals around both bore 74 and tube 26. It is desirable to preload the seal where the coupling is used with a vacuum line. Although ring 84 is shown in connection with a metal coupling body, it is equally adapted for use with a plastic body such as shown at 10 in FIG. 1.

I claim:

1. A releasable tube coupling comprising a body having a stepped bore therein, said bore having an open end for receiving one end of a tube and also having a radially inwardly projecting annular shoulder facing said open end and spaced axially inwardly therefrom, a spring metal ring in said bore, said ring having a circumferentially continuous radially inwardly directed annular portion provided with a central aperture to enable the end of the tube to be inserted therethrough, said ring having a plurality of circumferentially spaced fingers thereon projecting axially from the outer periphery of said annular portion and adapted to engage said shoulder in said bore to limit displacement of said ring in a direction axially inwardly of said bore, an annular seal in said bore having one side thereof axially abutting said annular portion of the ring on the side thereof opposite said fingers, said seal having an inner diameter dimensioned to seal with the outer periphery of a tube inserted therethrough and an outer diameter dimensioned to seal with said bore, means in said bore engaging the opposite side of said seal for retaining the seal in said bore, said ring also having a plurality of circumferentially spaced fingers thereon connected at their radially outer ends with said annular portion and inclined radially and axially inwardly of said bore, said spring fingers extending inwardly from the radially outermost periphery of said ring and terminating in sharp edges at their free inner ends which are spaced radially inwardly of the edge of the central aperture therein, whereby said spring fingers are adapted to frictionally engage and bite into the outer periphery of a tube inserted through said ring to prevent its withdrawal from within said body, said spring fingers having a length substantially greater than the radial distance between the inner and outer peripheries of said ring and, therefore, being readily flexible so as to accommodate tubing which is out-of-round and also tubing which may be smaller or larger than a nominal specified size.

2. A releasable tube coupling as called for in claim 1 wherein said annular portion is generally flat and lies in a radial plane.

3. A releasable tube coupling as called for in claim 1 wherein the outer ends of said spring fingers extend radially outwardly from said annular portion and then incline radially and axially inwardly from the outer periphery of the ring.

4. A releasable tube coupling as called for in claim 3 wherein the junction between the radially outwardly and the radially inwardly extending portions of each spring finger comprises a straight, rather than a circumferentially curved, bend and provides a readily flexible connection therebetween.

5. A releasable tube coupling as called for in claim 4 wherein said junctions are curved in a direction axially of the bore.

6. A releasable tube coupling as called for in claim 5 wherein the inwardly inclined portions of the spring fingers are of progressively increasing arcuate shape in cross section in a radially inward direction.

7. A releasable tube coupling as called for in claim 4 wherein said fingers are inclined to the axis of the bore at an angle of about 55°.

8. A releasable tube coupling as called for in claim 3 wherein said fingers are inclined to the axis of the bore at an angle of between about 45°–60°.

9. A releasable tube coupling as called for in claim 1 wherein said bore is formed with an annular groove axially adjacent said seal and said seal retaining means comprises a washer abutting said opposite side of the seal and a snap ring seated in said groove and retaining said washer.

10. A releasable tube coupling as called for in claim 1 wherein said body is formed with a crosswise slot extending therethrough axially adjacent said seal, said seal retaining means including yoke means extending through said slot.

11. A releasable tube coupling as called for in claim 10 wherein the radially inner ends of said yokes are joined together by a readily frangible connection.

12. A releasable tube coupling as called for in claim 10 wherein said slot has a width in a direction circumferentially of said body at least slightly greater than the diameter of the portion of the bore adjacent said seal, said yoke means comprising a pair of diametrically opposed yokes having a close fit in said slot, the inner ends of said yokes being semi-circular and retaining said seal at the axially outer side thereof.

13. A releasable tube coupling as called for in claim 12 wherein the outer ends of said yokes are substantially flush with the outer periphery of said body, said body having a pair of diametrically opposite recesses in the outer peripheral surface thereof communicating with said slot, said yokes each having an undercut portion facing said recesses to enable the end of a prying tool to be inserted into said undercuts through said recesses to pry the yokes radially outwardly from the slots.

14. A releasable tube coupling as called for in claim 13 wherein each yoke has a slight axially extending protrusion on the face thereof opposite said seal, said protrusions engaging the edge defining the junction of the slot with said bore to prevent free radial outward displacement of the yokes.

15. A releasable tube coupling as called for in claim 1 wherein the inner free ends of said fingers are curved to engage an arcuate segment of the outer peripheral surface of a tube inserted therethrough.

16. A releasable tube coupling as called for in claim 1 wherein the inner free ends of said spring fingers are serrated to form a plurality of sharp teeth thereon.

17. A releasable tube coupling as called for in claim 1 wherein said axially extending fingers engage said shoulder means to cause said retainer ring to axially compress said seal against said retaining means so that the inner and outer peripheries thereof sealingly engage the outer periphery of the tube and the inner periphery of the bore, respectively.

18. A releasable tube coupling as called for in claim 17 wherein said axially extending fingers are inclined radially inwardly and the axial compressive force applied to the seal by said ring is produced as a result of said last-mentioned fingers being flexed radially inwardly by said shoulder means.

19. A releasable tube coupling as called for in claim 18 wherein said shoulder means comprises a portion of said bore which tapers radially and axially inwardly.

20. A releasable tube coupling as called for in claim 19 wherein the tapered portion of said bore is inclined to the axis of the bore at a lesser angle than said last-mentioned fingers.

* * * * *